Oct. 6, 1931.  W. C. STEVENS  1,826,099
PHASE FAILURE AND PHASE REVERSE PROTECTIVE DEVICE
FOR POLYPHASE ALTERNATING CURRENT CIRCUITS
Filed June 18, 1928

INVENTOR
William C. Stevens.
BY
Frank H. Hubbard
ATTORNEY

Patented Oct. 6, 1931

1,826,099

UNITED STATES PATENT OFFICE

WILLIAM C. STEVENS, OF MILWAUKEE, WISCONSIN, ASSIGNOR, BY MESNE ASSIGNMENTS, TO CUTLER-HAMMER, INC., A CORPORATION OF DELAWARE

PHASE FAILURE AND PHASE REVERSE PROTECTIVE DEVICE FOR POLYPHASE ALTERNATING CURRENT CIRCUITS

Application filed June 18, 1928. Serial No. 286,262.

This invention relates to low voltage, phase failure and phase reverse protective devices for polyphase A. C. circuits.

Devices which embody an electromagnetically operated contactor having its operating winding connected in a three wire polyphase circuit in star relation with suitably proportioned impedances and calibrated to close and remain closed while a given phase relation of the circuit is maintained and to open when this phase relation is changed or upon phase failure, are known in the art.

Such devices are commonly used in connection with dynamo electric machines which generate a counter-electromotive force and as such devices have been designed heretofore the desired operation thereof is frequently defeated by such counter-electromotive force. As in the case of an electric motor operating under a light load this counter-electromotive force frequently approximates the voltage of the line and maintains the protective device energized, thus keeping the motor running single phase.

Also such devices as heretofore designed are open to the objection that if upon phase reversal they are set by hand they will remain set, as the voltage necessary to maintain the electromagnetic switches thereof closed is low relative to the voltage necessary to close them.

The present invention has among its objects that of providing an improved protective device embodying the foregoing principle and overcoming the aforementioned and other difficulties heretofore experienced.

Other objects and advantages will hereinafter appear.

The accompanying drawings illustrate diagrammatically one embodiment of the invention and the same will now be described it being understood that the invention is capable of embodiment in other forms falling within the scope of the appended claims.

Figure 1:
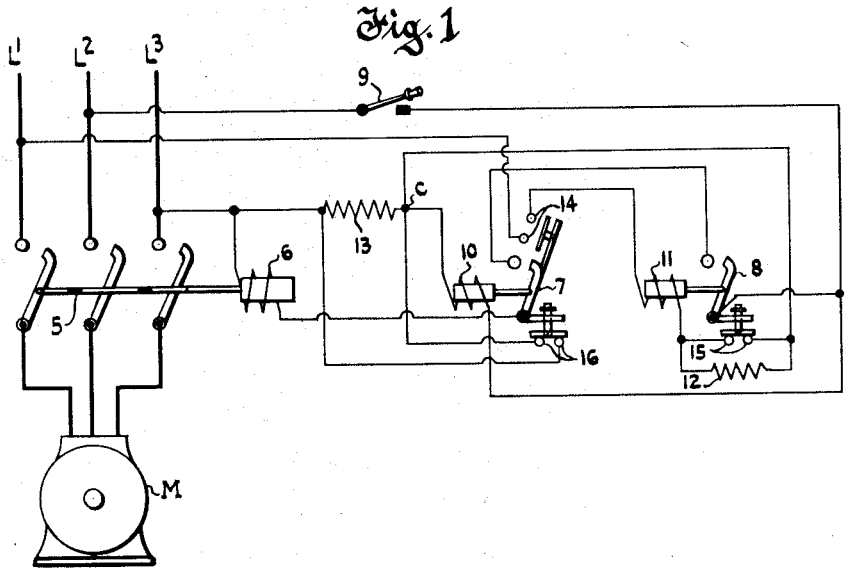
Figure 2:
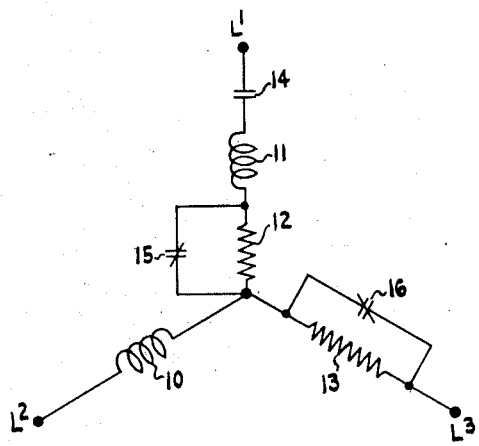

Figure 1 is a diagram illustrating a preferred form of protective device used in connection with an electric motor, and Fig. 2 is a simplified diagram of certain of the circuits shown in Figure 1.

Referring to Figure 1, $L^1$, $L^2$ and $L^3$ are supply lines of a three-wire polyphase circuit feeding a motor M or other translating device and provided with an electromagnetic main switch 5 which has an actuating coil 6. This coil which may be connected across any two of the supply lines has connections controllable jointly by electroresponsive switches 7 and 8 while a knife switch 9 is arranged in said connections to provide for manual control of said coil 6.

Switch 7 is provided with an operating winding 10, one end of which is connected to the line $L^2$ through the knife switch 9, while the other end of said coil is connected to point C which forms the center point of a star connected system of impedances. The switch 7 has contacts 14 which when closed connect one end of coil 11 of switch 8 to line $L^1$ while the other end of coil 11 is connected through the low inductance resistance 12 to the point C. Resistance 12 is paralleled by auxiliary contacts 15 operated by switch 8, said contacts being closed at all times except in the uppermost or closed position of switch 8. A third connection is provided between line $L^3$ and the center point C, through the low inductance resistance 13 which resistance is paralleled by contacts 16 operated by switch 7 and arranged so that they are closed at all times except when switch 7 is fully closed.

It is known that switches having operating coils connected in circuit as shown in the diagram are subject to different degrees of energization corresponding to different conditions of phase rotation of the circuit and also dependent upon the energization of two lines of the supply circuit. Such switches may thus be calibrated to respond when under conditions of phase rotation which correspond to the higher degree of energization of their winding and when so calibrated they will remain unresponsive under different conditions of phase rotation or following reduction of energization of either of said two supply lines below a given value.

Resistances 12 and 13 have preferably a low or no inductance and are of such value that when inserted the energization of coil 11 is not sufficient to close the switch even when the line voltage is normal and the phase rotation is correct but are of sufficiently low value to keep the switch 8 closed when inserted after the switch has been closed by a higher current. Furthermore resistance 13 is of such a value that when in circuit the energization of coil 10 of switch 7 is not sufficient to cause this switch to close even under normal circuit conditions but is sufficient to permit the switch to stay closed after it has been closed by a higher current.

The operation of the device is as follows:

Assuming normal voltage and normal phase rotation of the system, closure of switch 9 connects coil 10 of switch 7 across the lines $L^2$ and $L^3$ causing the switch to close. Immediately upon closure of the switch it opens contacts 16 thus inserting resistance 13 in series with its operating coil. It also closes the auxiliary contacts 14 thereby connecting coil 11 of switch 8 between point C and the line $L^1$. Switch 8 is thus caused to close thereby opening auxiliary contacts 15 and inserting resistance 12 in series with coil 11 and the point C. Closure of switches 7 and 8 completes the circuit of coil 6 of the main switch 5 from line $L^2$ through switch 9, switch contacts 8, switch contacts 7, coil 6 to line $L^3$. In case of failure of voltage in any one of the three lines the voltage impressed upon the coils 10 or 11 is sufficiently reduced to cause the corresponding switches to open their circuit and to remain open as long as the abnormal condition exists. Furthermore in case the phases should be reversed the voltage impressed upon coil 11 is reduced to such a degree that the corresponding switch will open thus opening the circuit of the coil 6 of the main switch 5 and disconnecting the motor from the line.

What I claim as new and desire to secure by Letters Patent is:

1. A protective device for polyphase circuits comprising electromagnetic switches each having a single phase magnetic circuit, a resistance, a star connection for said switches and said resistance and means associated with one of said switches to commutate said resistance to thereby cause said switches to respond in accordance with the condition of phase rotation of such circuit.

2. A protective device for polyphase circuits comprising electromagnetic switches each having a single phase magnetic circuit, a resistance, a star connection for said switches and said resistance and means associated with one of said switches to control said resistance to thereby cause said switches to respond in accordance with the line energization and phase rotation of said circuit.

3. A protective device for polyphase circuits comprising electromagnetic switches each having a single phase magnetic circuit, a resistance, a star circuit connection for said switches and said resistance, a second resistance in circuit with one of said switches, said switches being adapted to commutate said resistances, to thereby cause said switches to respond in accordance with the condition of phase rotation of such circuit.

4. The combination with a polyphase circuit, of protective means therefor, comprising electromagnetic switches each having a single phase magnetic circuit, a resistance, a second resistance in circuit with one of said switches, said switches being adapted to commutate said resistances and connections between said polyphase circuit, the coils of said switches and said first mentioned resistance, placing said coils and said resistance in star relation to one another.

5. The combination with a polyphase circuit, of phase failure and phase protective means therefor comprising electromagnetic switches each having a single phase magnetic circuit, a resistance, a second resistance in circuit with one of said switches, and means to commutate said resistances and to connect the coils of said switches and said first resistance respectively to different lines of said polyphase circuit in star relation to one another for subjecting said switches to control in accordance with the conditions of line energization and phase rotation of said circuit.

6. The combination with a polyphase circuit and a translating device connected thereto, of phase failure and phase protective means therefor comprising electromagnetic switches each having a single phase magnetic circuit, a resistance, a second resistance in circuit with one of said switches, and means to commutate said resistances and to connect the coils of said switches and said first resistance respectively to different lines of said polyphase circuit in star relation to one another for subjecting said switches to control in accordance with the conditions of line energization and phase rotation of said circuit.

7. The combination with a polyphase circuit and a translating device to be connected thereto, of switches having individual closing coils including a main switch and switches to control jointly the energizing circuit of said main switch, a resistance, a second resistance in circuit with one of said second mentioned switches, means to commutate said resistances, and means to connect the closing coils of said second mentioned switches and said first resistance to said circuit in star relation providing for closure of said switches but only under given conditions of line energization and phase rotation of said circuit.

8. A protective device for polyphase circuits comprising two electromagnetic switches each having a single magnetic circuit, a resistance, a star connection for said switches and said resistance, a contact controlling one of said switches and controlled by the second switch, a second resistance in series with said first switch a second contact on said second switch to control said first resistance and a contact on said first switch controlling said second resistance, to thereby subject said switches to control in accordance with the condition of phase rotation and line energization of said circuit.

In witness whereof, I have hereunto subscribed my name.

WILLIAM C. STEVENS.